US011512726B2

(12) United States Patent
Wang

(10) Patent No.: US 11,512,726 B2
(45) Date of Patent: Nov. 29, 2022

(54) QUICK-FITTING STOOL

(71) Applicant: SHENZHEN MEILIWANG INTELLIGENT TECHNOLOGY CO., LTD, Shenzhen (CN)

(72) Inventor: Shengli Wang, Shenzhen (CN)

(73) Assignee: SHENZHEN MEILIWANG INTELLIGENT TECHNOLOGY CO., LTD, Shenzhen (CN)

( * ) Notice: Subject to any disclaimer, the term of this patent is extended or adjusted under 35 U.S.C. 154(b) by 119 days.

(21) Appl. No.: 16/830,453

(22) Filed: Mar. 26, 2020

(65) Prior Publication Data

US 2020/0309178 A1    Oct. 1, 2020

(30) Foreign Application Priority Data

Mar. 26, 2019   (CN) ......................... 201920398051.2

(51) Int. Cl.
| | |
|---|---|
| *F16B 12/02* | (2006.01) |
| *A47B 67/00* | (2006.01) |
| *A47C 7/62* | (2006.01) |
| *A47C 4/02* | (2006.01) |
| *A47B 79/00* | (2006.01) |
| *B65D 43/16* | (2006.01) |
| *A47B 47/00* | (2006.01) |
| *A47C 16/02* | (2006.01) |

(52) U.S. Cl.
CPC .......... *F16B 12/02* (2013.01); *A47B 47/0091* (2013.01); *A47B 67/00* (2013.01); *A47B 79/00* (2013.01); *A47C 4/02* (2013.01); *A47C 7/628* (2018.08); *A47C 16/02* (2013.01); *B65D 43/16* (2013.01); *A47B 2230/02* (2013.01)

(58) Field of Classification Search
CPC . F16B 12/02; A47B 47/0091; A47B 2230/02; A47B 67/00; A47B 79/00; A47C 16/02; A47C 7/628; A47C 4/02; B65D 43/16
USPC ........................................... 312/257.1, 265.2
See application file for complete search history.

(56) References Cited

U.S. PATENT DOCUMENTS

| | | | | |
|---|---|---|---|---|
| 2,950,753 A | * | 8/1960 | Gleitsman ............ | A47C 16/025 |
| | | | | 297/188.01 |
| 2,967,747 A | * | 1/1961 | Bus ..................... | F16B 12/2036 |
| | | | | 312/265.5 |

(Continued)

FOREIGN PATENT DOCUMENTS

EP            3242042 A3 *  12/2017  ........... A47B 88/919

*Primary Examiner* — Janet M Wilkens
*Assistant Examiner* — Timothy M Ayres

(57) ABSTRACT

A quick-fitting stool includes a main plate, side plates, and corner protectors having same number as number of the side plates. Each of the side plates and the corner protectors are alternately arranged to form a circumferentially closed side wall. The corner protectors extend in a height direction, and the corner protectors includes first mounting surfaces and second mounting surfaces spliced to two adjacent side plates respectively. The first mounting surfaces and the second mounting surfaces are detachably connected to the two adjacent side plates. An outer side surface of the corner protectors is flush with an outer side surface of the side plates. The main plate is horizontally placed on upper side surfaces of the side plates. The side plates support the main plate, and is connected with an upper side edge of at least one of the side plates.

9 Claims, 7 Drawing Sheets

(56) References Cited

U.S. PATENT DOCUMENTS

| | | | | |
|---|---|---|---|---|
| 2,980,482 | A * | 4/1961 | Baio | A47B 47/05 |
| | | | | 312/265.1 |
| 3,856,371 | A * | 12/1974 | Forsyth | A47B 17/003 |
| | | | | 312/195 |
| 4,378,137 | A * | 3/1983 | Gibson | A47B 87/02 |
| | | | | 312/108 |
| 4,886,326 | A * | 12/1989 | Kuzyk | A47B 47/0041 |
| | | | | 312/257.1 |
| D351,508 | S * | 10/1994 | Bonazza | D6/336 |
| 5,538,320 | A * | 7/1996 | Hoffman | A47C 13/00 |
| | | | | 297/188.1 |
| 6,152,553 | A * | 11/2000 | Wunderlich | A47B 47/0091 |
| | | | | 108/110 |
| D515,847 | S * | 2/2006 | Moon | D6/675.1 |
| 7,223,045 | B2 * | 5/2007 | Migli | F16B 12/2009 |
| | | | | 29/452 |
| 9,526,331 | B2 * | 12/2016 | Vazquez | A47B 96/14 |
| 2002/0190614 | A1 * | 12/2002 | Reuter | A47B 47/05 |
| | | | | 312/257.1 |
| 2003/0020382 | A1 * | 1/2003 | Herbeck | F24F 13/20 |
| | | | | 312/265.4 |
| 2004/0222722 | A1 * | 11/2004 | Yang | A47B 47/0041 |
| | | | | 312/265.5 |
| 2007/0132345 | A1 * | 6/2007 | Lai | A47B 47/005 |
| | | | | 312/265.4 |
| 2014/0252934 | A1 * | 9/2014 | Schag | A47B 96/20 |
| | | | | 312/326 |
| 2019/0116983 | A1 * | 4/2019 | Claypoole | A47C 7/628 |
| 2020/0281363 | A1 * | 9/2020 | Claypoole | A47C 1/146 |

* cited by examiner

QUICK-FITTING STOOL

TECHNICAL FIELD

The present disclosure relates to a field of furniture, in particular to a quick-fitting stool with a storage function.

BACKGROUND

In the prior art, a simple stool, or the like, is usually assembled using several side plates and locking the side plates, so that sharp corners usually appear at corners of the simple stool, which cause safety risks.

In addition, one side of a side plate is usually exposed at a splicing position of two side plates. In order to ensure a good appearance of the simple stool, the exposed side also needs to be processed, which increases difficulty and costs.

Further, if two adjacent side plates need to be quickly disassembled and installed, at least one of the side plates is reserved for an installation of the quick-fitting parts on an outer surface of the side plates, which makes the appearance of the simple stool ugly.

What is more, if the side plates are made of wood, it increases costs such as machining, painting and other processes on chamfering at the corners of the side plates.

Furthermore, a bottom of the conventional simple stool usually does not have rollers. Even if the simple stool has rollers, when a person sits on the simple stool, the simple stool is supported by the rollers. Support structures on an upper portion of the simple stool do not contact the ground, so there is a risk that the simple stool will move, which causes the person sitting on to slip or fall.

SUMMARY

A technical problem to be solved by the present disclosure is to provide a quick-fitting stool with a storage function, which is able to be quickly and easily assembled and has a beautiful appearance.

The present disclosure provides a quick-fitting stool with a storage function. In the present disclosure, each of vertical strip-shaped corner protectors are provided between vertical sides of every adjacent two side plates. The corner protectors take up less space when transported separately. In addition, it is also convenient to install connection structures on the first mounting surfaces and the second mounting surfaces of the corner protectors. And then the connection structures are connected to the vertical sides of the side plates, which simplifies an assembly of the quick-fitting stool. The vertical sides of the side plates are shielded by the corner protectors, which prevent formation of installation marks on outer surfaces and improve an appearance of the quick-fitting stool.

In addition, when the quick-fitting stool with the storage function is loaded (e.g., a person is sitting on it), elastic members are compressed to allow rollers to be received in a storage cavity close to a bottom plate, thereby stabilizing the quick-fitting stool and preventing the person sitting on from slipping and falling.

BRIEF DESCRIPTION OF DRAWINGS

The present invention will be further described below with reference to the accompanying drawings and embodiments. In the drawings.

DETAILED DESCRIPTION

In order to have a clearer understanding of technical features, objectives, and effects of the present disclosure, specific embodiments of the present disclosure will now be described in detail with reference to the drawings.

Figure 1:
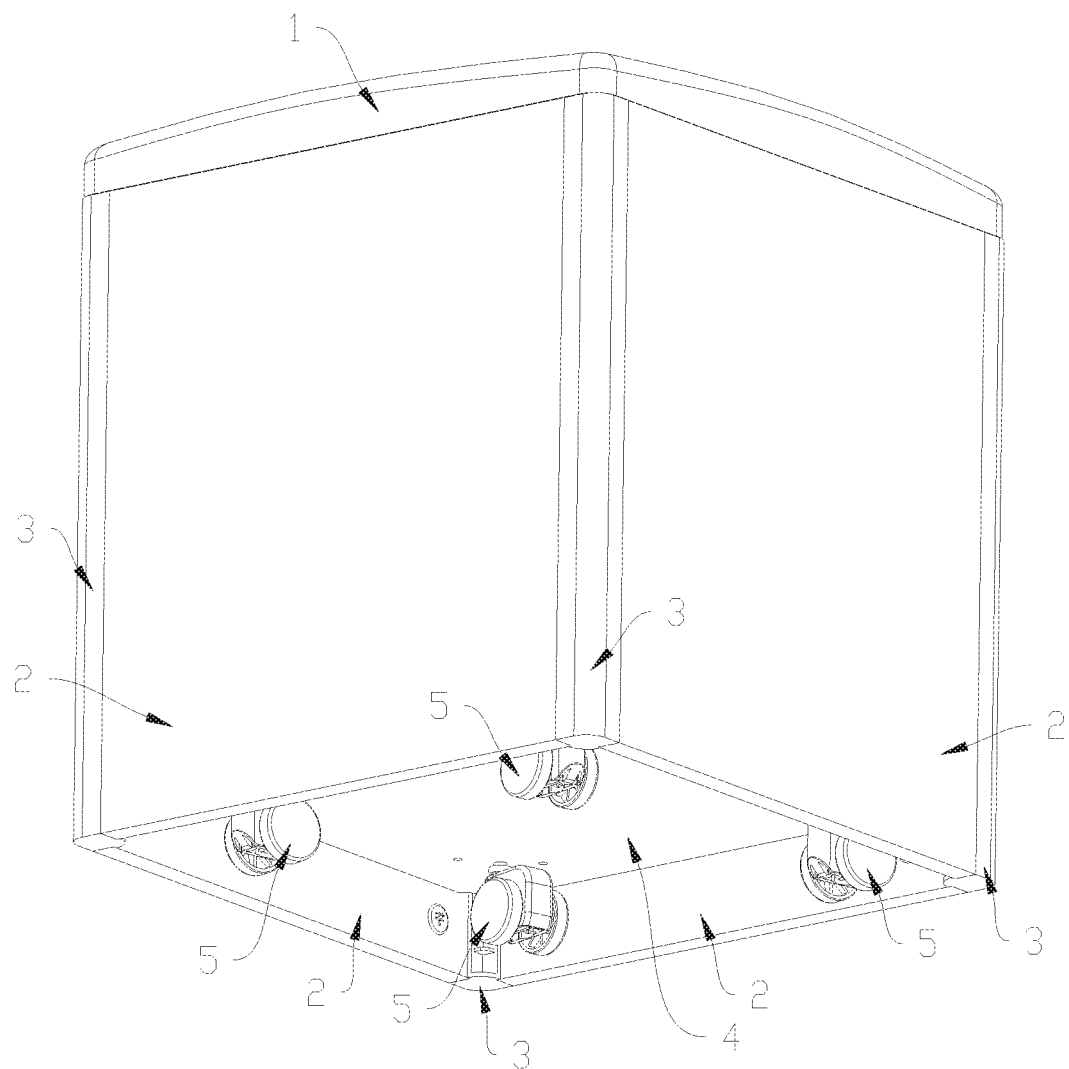
FIG. 1 is a perspective schematic diagram showing a structure of a quick-fitting stool according to one embodiment of the present disclosure.
Figure 2:
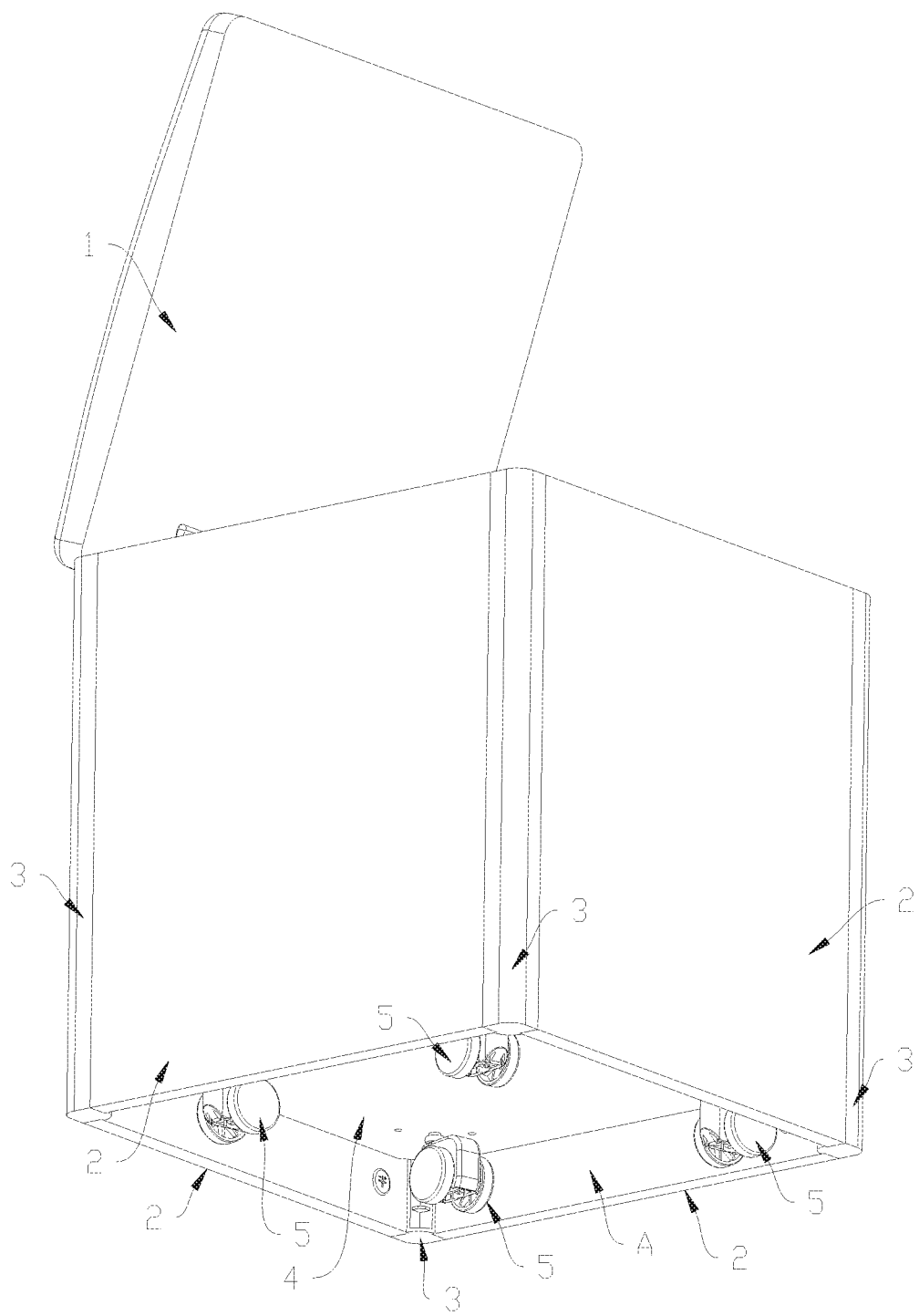
FIG. 2 is a schematic diagram showing a structure of the quick-fitting stool shown in FIG. 1 where a main plate is turned upside.

As shown in FIGS. 1-2, in one embodiment, the present disclosure provides a quick-fitting stool with a storage function. The quick-fitting stool includes a main plate 1, four side plates 2, and corner protectors 3 having a same number as number of the side plates 2. Each of the side plates 2 and each of the corner protectors 3 are alternately arranged, and are enclosed to form a circumferentially closed side wall. In one embodiment, the number of the side plates 2 is three or more than three, and the corner protectors 3 generally remains the same as the number of the side plates 2.

As shown in FIGS. 3-6, the corner protectors 3 extend in a height direction. Each of the corner protectors 3 includes a first mounting surface 31 and a second mounting surface 32 spliced to two adjacent side plates 2, respectively. The first mounting surface 31 and the second mounting surface 32 of each of the corner protectors 3 are detachably connected to the two adjacent side plates 2 respectively, which realize disassembly and assembly of the quick-fitting stool with the storage function.

In one embodiment, the main plate 1 is horizontally placed on an upper side surface of each of the side plates 2. The side plates 2 support the main plate 1, and the main plate 1 is connected with an upper side edge of one of the side plates 2. In other embodiments, the main plate can also be quickly connected to a plurality of side panels 2.

In one embodiment, the corner protectors 3 are vertical strip-shaped and the vertical strip-shaped corner protectors 3 are connected between vertical sides of every adjacent two side plates 2. The corner protectors 3 take up less space when transported separately. In addition, it is also convenient to install connection structures on the first mounting surfaces 31 and the second mounting surfaces 32 of the corner protectors 3. And then the connection structures are connected to the vertical sides of the side plates 2, which simplifies an assembly of the quick-fitting stool. The vertical sides of the side plates 2 are shielded by the corner protectors 3, which prevent formation of installation marks on outer surfaces and improve an appearance of the quick-fitting stool.

In one embodiment, a side edge of each of the corner protectors 3 away from the side plates 2 is provided with an arc-shaped chamfer, which avoids sharp corners at the corners, reduces safety risks. In other embodiments, the chamfer may be a bevel, however, the present disclosure is not limited thereto.

In one embodiment, first lock holes 21 and first location holes 22 are arranged on a side of each of the side plates 2 spliced to one adjacent corner protector 3. Both of the first mounting surface 31 and the second mounting surface 32 of each of the corner protectors 3 include protruding lock heads 33 and first location posts 34. The lock heads 33 and the first location posts 34 are detachably mounted on the corner protectors 3, which saves space occupied during transportation.

In one embodiment, when assembled, the lock heads 33 are inserted into the first lock holes 21 of the adjacent side plate 2, and the first location posts 34 are inserted into the first location holes 22 of the adjacent side plate 2, thereby implementing an initial connection of the quick-fitting stool. In addition, a plurality of second lock holes 23 respectively communicating with the first lock holes 21 are arranged on an inner wall of each of the side plates 2. The second lock holes include lock parts 24 arranged in the second lock holes 23 configured to lock and fix with the lock heads 33 inserted in the first lock holes 21. The lock parts 24 are capable of rotating to different positions, so that when the lock parts 24 are rotated to a specific position, the lock parts 24 locked with the lock heads 33 to fix positions of the lock heads 33, or when the lock parts 24 are rotated to another specific position, the lock parts 24 are unlocked with the lock heads 33 to pulled out the lock heads 33.

In one embodiment, a width of the first mounting surfaces 31 and a width of the second mounting surfaces 32 are respectively equal to a thickness of the adjacent side plate 2, which facilitates installation and positioning of side plates 2 and corner protectors 3. Furthermore, the corner protectors 3 are formed by injection molding or die casting, which facilitates the installation and reduce a weight of the quick-fitting stool. The lock heads 33 are connected with the corner protectors 3 through threads, which makes installation positions stable and facilitates locking of the corner protectors 3. The first location posts 34 are inserted into the corner protectors 3 for positioning purposes.

In one embodiment, the main plate 1 is connected to an upper side of one of the side plates 2 so as to be able to be turned upside, which simplifies installation. The main plate 1 is also able to be flipped to open an upper portion of the quick-fitting stool. In order to sit more comfortably, a soft seat cushion is arranged on the main plate 1. The cushion is made of fabric or leather, and can also function as a cover of the quick-fitting stool with the storage function.

Figure 3:
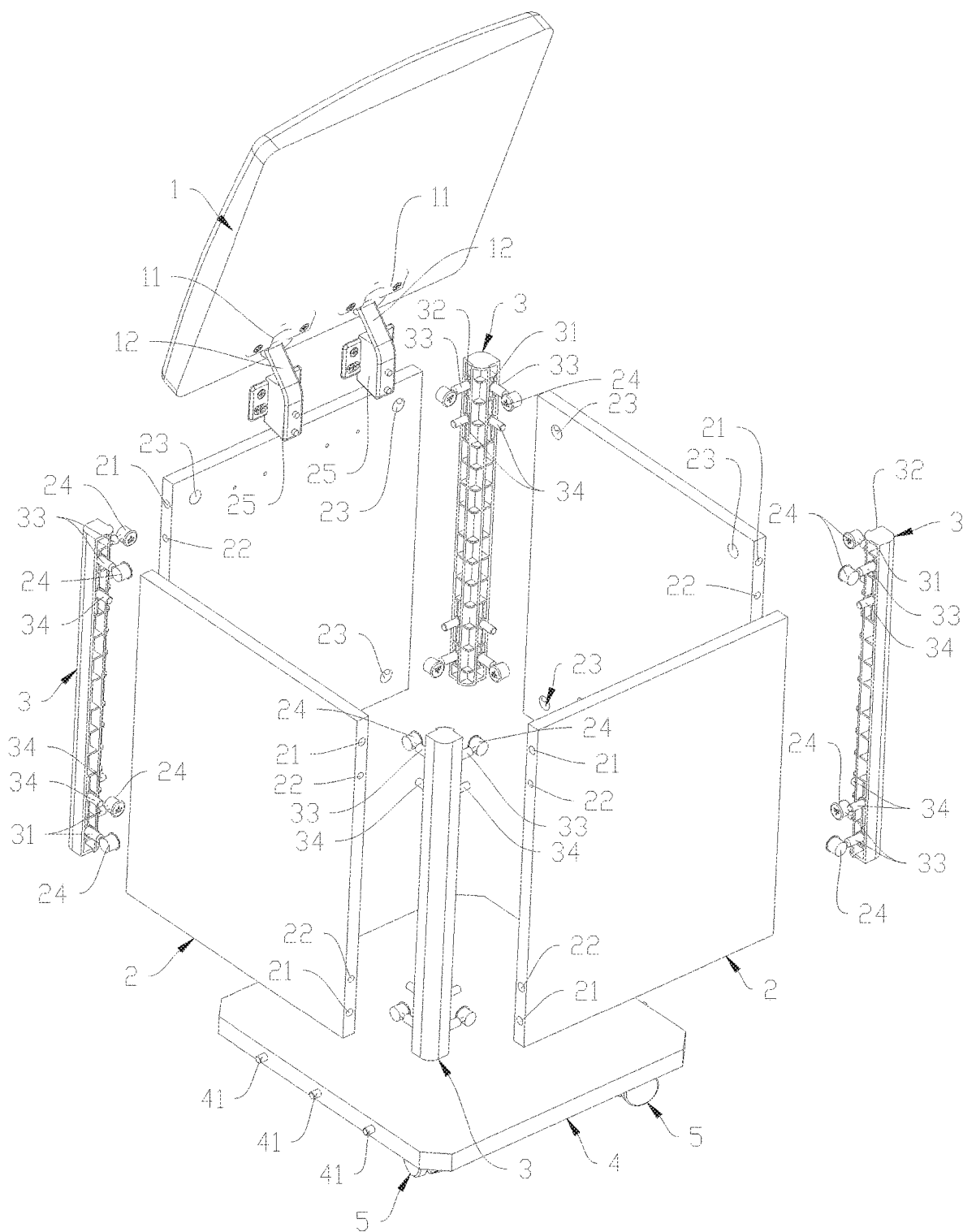
FIG. 3 is an exploded view of the quick-fitting stool shown in FIG. 2.
Figure 4:
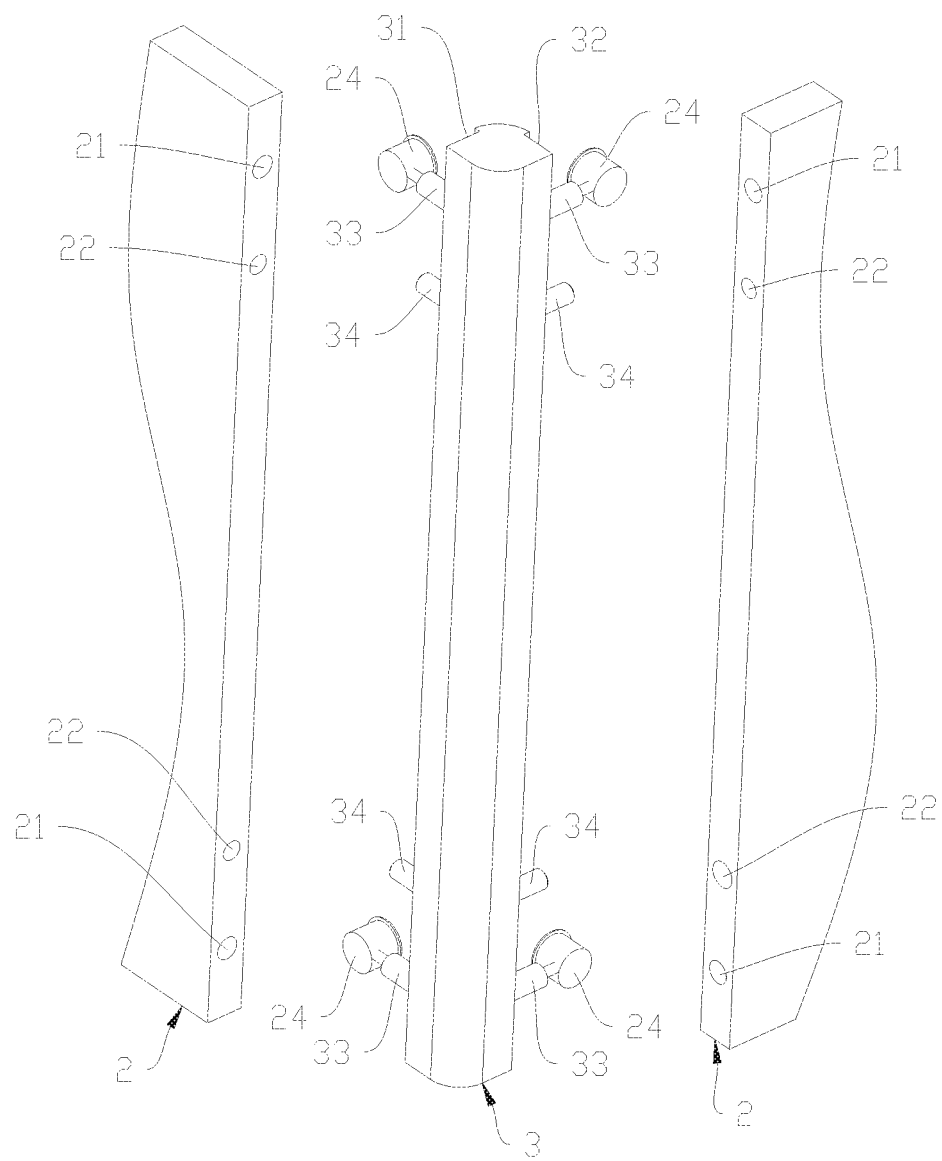
FIG. 4 is an exploded view showing an external side view of one corner protector and adjacent two side plates in FIG. 3.
Figure 5:
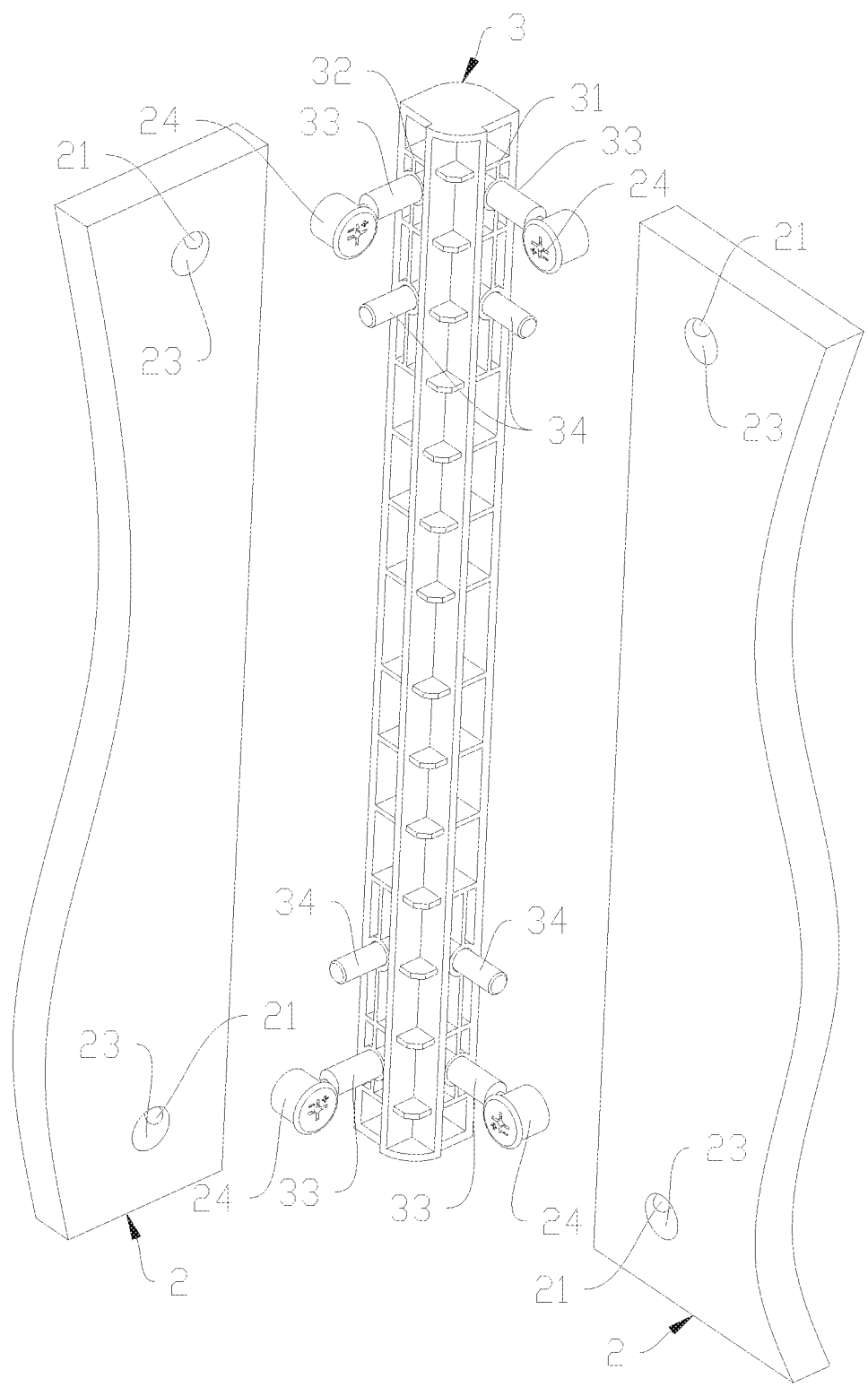
FIG. 5 is an exploded view showing an inner side view of one corner protector and adjacent two side plates in FIG. 3.

As shown in FIG. 3, the quick-fitting stool further include a first rotating base 25 arranged on an inner side of the one of the side plates 2, and a second rotating base 11 arranged on an inner side of the main plate 1. The first rotating base and the second rotating base are arranged inside the quick-fitting stool. The first rotating base 25 is rotatably connected with the second rotating base 11.

In one embodiment, a damper 12 limiting a rotating speed of the first rotating base 25 and the second rotating base 11 is arranged between the first rotating base 25 and the second rotating base 11. The damper 12 is not able to be in place immediately when the main plate 1 is opened or closed, and is slowly turned to prevent pinching of hands when the main plate 1 is closed.

Figure 6:
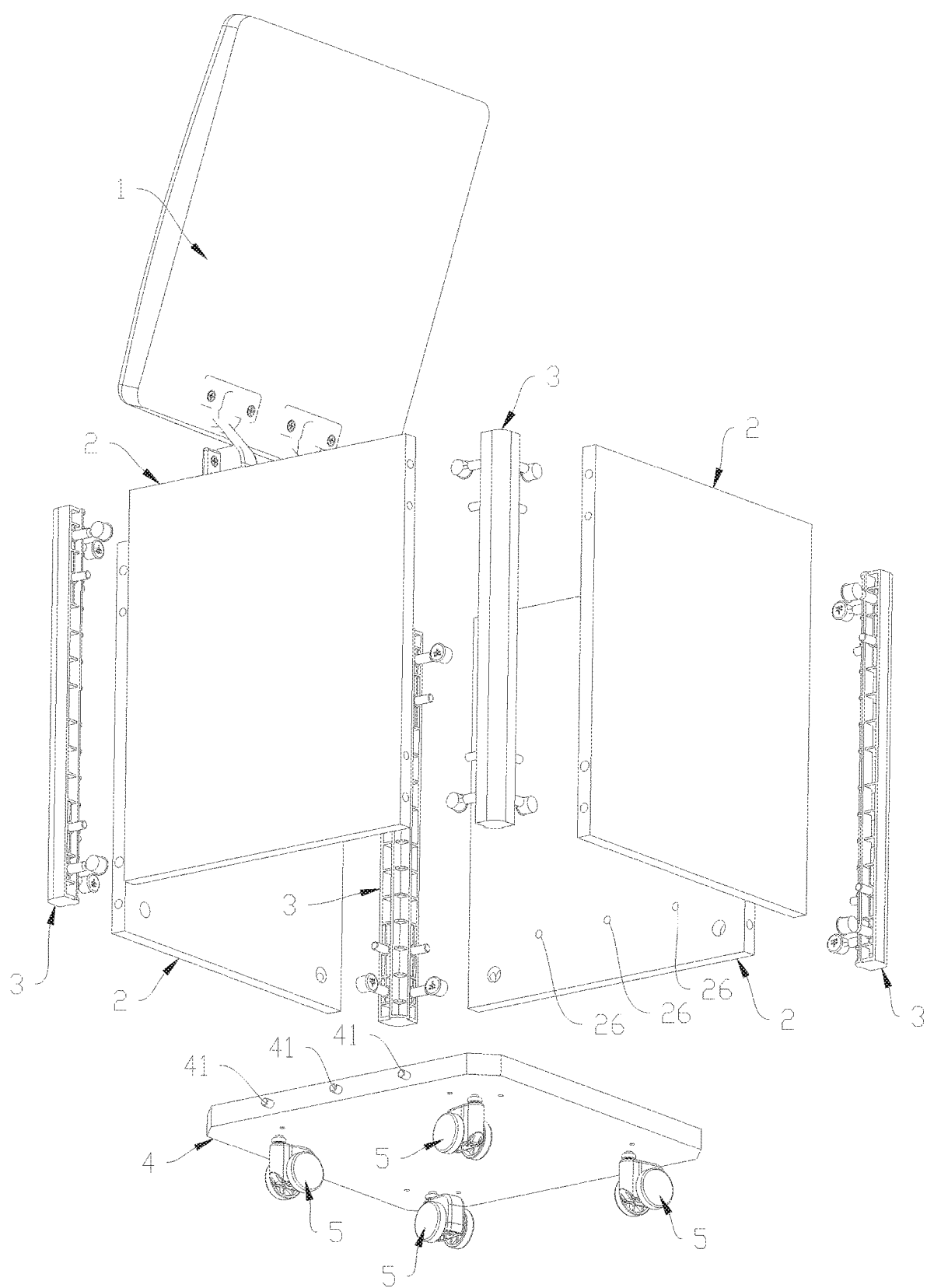
FIG. 6 is another exploded view of the quick-fitting stool shown in FIG. 2.

As shown in FIG. 6, the quick-fitting stool further includes a bottom plate 4 arranged on an inner side of the circumferentially closed side wall. The bottom plate 4 is close to a lower end of the quick-fitting stool. A plurality of second location posts 41 are arranged on sides of the bottom plate 4. A plurality of second location holes 26 are arranged on the inner side of the circumferentially closed side wall. Each of the second location posts 41 is inserted into each of the second location holes 26 to fix the bottom plate 4 to the side plates 2. The bottom plate 4 forms a storage space in cooperation with the side plates 2 and the main plate 1, such that small items, such as toys, can be stored in the storage space.

As shown in FIGS. 2 and 6, in one embodiment, in order to move the quick-fitting stool easily, rollers 5 are arranged on a lower side surface of the bottom plate 4. The quick-fitting stool can be moved via the rollers 5 by external pushing force, so even a child is able to move the quick-fitting stool by himself without lifting it.

Figure 7:
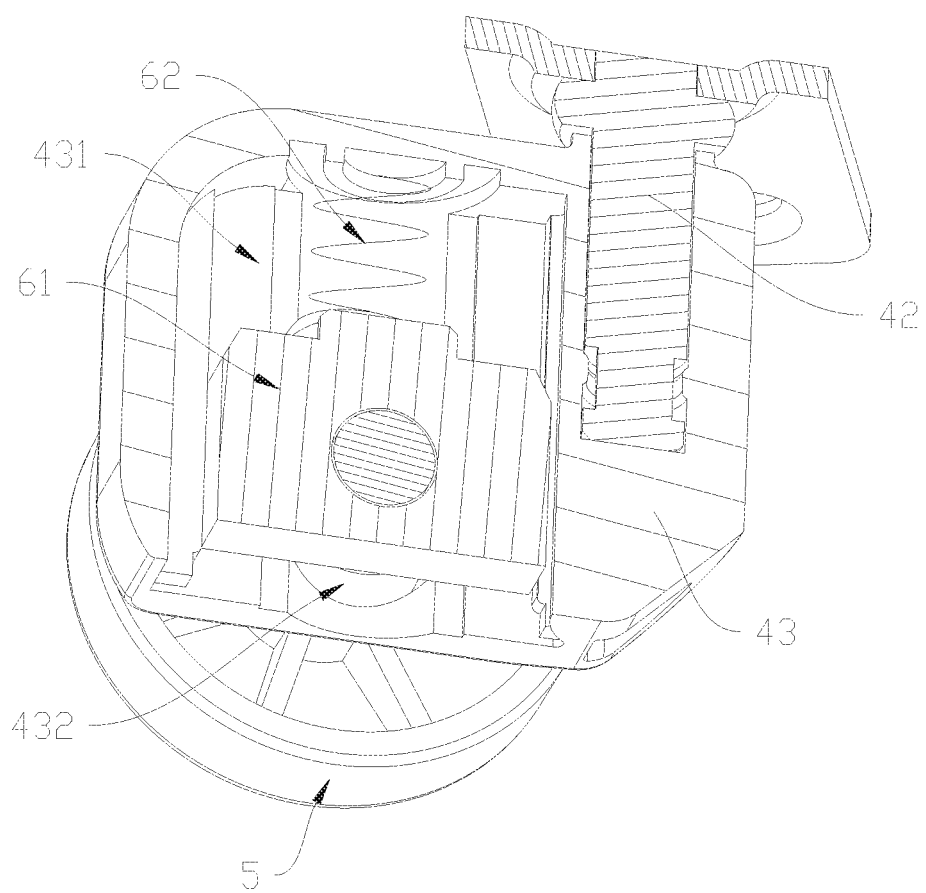
FIG. 7 is a cross sectional view of one roller and one telescoping assembly shown in FIG. 6 where a roller and a telescoping assembly are assembled.

Furthermore, the bottom plate 4 is upwardly offset from a lower side of the side plates 2. And a storage cavity A is formed on the lower side of the bottom plate 4. As shown in FIG. 7, in one embodiment, location shafts 42 and mounting bases 43 rotatably matched with the location shafts 42 are arranged on the lower side of the bottom plate 4. An axis of the location shafts 42 is arranged along a vertical direction. A lower surface of the mounting bases 43 is flush with the lower side of the side plates 2 on the height direction.

In one embodiment, telescoping assemblies 6 capable of extending up and down are connected between rotating shafts of the rollers 5 and the bottom plate 4. When the quick-fitting stool with the storage function is loaded, the telescoping assemblies 6 are compressed to make the rollers 5 approach the bottom plate 4. And then the rollers 5 are received in the storage cavity A, so that a bottom portion of the rollers 5 is flush with a bottom edge of the side plates 2 and abuts against the ground. Thus, when a person sits on the quick-fitting stool, the bottom edge of the side plates 2 and the lower surfaces of the mounting bases 43 directly contact the ground, so that the quick-fitting stool is supported by the side plates 2 and the mounting bases 43. This structure stabilizes the quick-fitting stool and prevents the quick-fitting stool from sliding and falling, and further prevents accidents. After the person gets up from the quick-fitting stool, under an elastic effect of the telescoping assemblies 6, the side plates 2 are moved upward again, so that the rollers 5 are exposed from the lower part of the storage cavity A, and the rollers 5 roll on the ground to facilitate movement and use of the quick-fitting stool.

In one embodiment, the telescoping assemblies 6 include support bases 61 and elastic members 62. Sliding grooves 431 extending in a height direction are arranged on the mounting bases 43. The support bases 61 are arranged in the sliding grooves 431 and are capable of sliding up and down along the sliding grooves 431. Each of the elastic members 62 is disposed between each of the support bases 61 and each of the mounting bases 43, and the elastic member 62 are configured to provide a downward force to the support bases 61.

Each of the rotating shafts of the rollers 5 is horizontally arranged and is rotatably matched with each of the support bases 61. Limiting holes 432 for the rotating shafts of the rollers 5 to pass through horizontally are arranged on the mounting bases 43. A size of the limiting holes 432 limits a movement of the rotating shafts in the height direction. When the quick-fitting stool is loaded and compress the elastic members 62, the support bases 61 slide upward along the sliding grooves 431, and the rollers 5, the rotating shafts of the rollers 5, and the support bases 61 move approaching the bottom plate 4, so that the lower surface of the mounting base 43 reaches and contacts ground. In other embodiments, the lower surfaces of the mounting bases 43 may be higher than lower end surfaces of the side plates 2.

It should be understood that the foregoing technical features can be used in any combination without limitation.

The above descriptions are only some embodiments of the present disclosure, and thus do not limit the scope of the present disclosure. Any equivalent structure or equivalent process transformation made by the specification and drawings of the present disclosure or any equivalent structure or equivalent process directly or indirectly used in other related technical fields are within the scope of the present disclosure.

What is claimed is:

1. A quick-fitting stool, comprising:
a main plate, at least three side plates, and corner protectors, wherein a number of the corner protectors is a same number as a number of the side plates;
wherein each of the side plates and each of the corner protectors are alternately arranged, and are enclosed to form a circumferentially closed side wall;
the corner protectors extend in a height direction, and each of the corner protectors comprises a first mounting surface and a second mounting surface spliced to two adjacent side plates, respectively;
the first mounting surface of each of the corner protectors and the second mounting surface of each of the corner protectors are detachably connected to the two adjacent side plates, and an outer side surface of the corner protectors is flush with an outer side surface of the side plates;
the main plate is horizontally placed on an upper side surface of each of the side plates, the side plates support the main plate, and the main plate is connected with an upper side edge of at least one of the side plates;
wherein first lock holes and first location holes are arranged on a side of each of the side plates spliced to one adjacent corner protector; both of the first mounting surface and the second mounting surface of each of the corner protectors comprise protruding lock heads and first location posts;
wherein the quick-fitting stool further comprises a bottom plate arranged on an inner side of the circumferentially closed side wall; rollers are arranged on a lower side surface of the bottom plate; the bottom plate is connected with the circumferentially closed side wall; a lower end of the circumferentially closed side wall is lower than the bottom plate to define a storage cavity; the storage cavity is configured to receive the rollers; a plurality of second location posts are arranged on two sides of the bottom plate; a plurality of second location holes are arranged on the inner side of the circumferentially closed side wall, and each of the second location posts is inserted into each of the second location holes to fix the bottom plate to the side plates.

2. The quick-fitting stool according to claim 1, wherein a side edge of each of the corner protectors away from the side plates is provided with an arc-shaped chamfer.

3. The quick-fitting stool according to claim 1, wherein the lock heads are inserted into the first lock holes of the adjacent side plate; and the first location posts are inserted into the first location holes of the adjacent side plate; a plurality of second lock holes respectively communicating with the first lock holes are arranged on an inner wall of each of the side plates; the second lock holes comprise lock parts arranged in the second lock holes configured to lock and fix with the lock heads inserted in the first lock holes.

4. The quick-fitting stool according to claim 1, wherein a width of the first mounting surfaces and a width of the second mounting surfaces are respectively equal to a thickness of the adjacent side plate; and the corner protectors are formed by injection molding or die casting; the lock heads are connected with the corner protectors through threads; and the first location posts are inserted into the corner protectors.

5. The quick-fitting stool according to claim 1, wherein the main plate is connected to an upper side of one of the side plates so as to be able to be turned upside.

6. The quick-fitting stool according to claim 5, wherein further comprises a first rotating base arranged on an inner side of the one of the side plates, and a second rotating base arranged on an inner side of the main plate; the first rotating base is rotatably connected with the second rotating base, so the main plate is rotatably connected with the one of the side plates; a damper limiting a rotating speed of the first rotating base and the second rotating base is arranged between the first rotating base and the second rotating base.

7. The quick-fitting stool according to claim 6, wherein a soft seat cushion is arranged on the main plate.

8. The quick-fitting stool according to claim 1, wherein the bottom plate is upwardly offset from a lower side of the side plates;
telescoping assemblies capable of extending up and down are connected between rotating shafts of the rollers and the bottom plate; when the quick-fitting stool is loaded, the telescoping assemblies are compressed to make the rollers approach the bottom plate and are received in the storage cavity, so that a bottom portion of the rollers is flush with a bottom edge of the side plates.

9. The quick-fitting stool according to claim 8, wherein location shafts and mounting bases rotatably matched with the location shafts are arranged on the lower side of the bottom plate; an axis of the location shafts is arranged along a vertical direction; a lower surface of the mounting bases is flush with the lower side of the side plates on the height direction;
the telescoping assemblies comprise support bases and elastic members; sliding grooves extending in a height direction are arranged on the mounting bases; the support bases are arranged in the sliding grooves and are capable of sliding up and down along the sliding grooves; each of the elastic members is disposed between each of the support bases and each of the mounting bases; and the elastic member are configured to provide a downward force to the support bases;
wherein each of the rotating shafts of the rollers is horizontally arranged and is rotatably matched with each of the support bases; limiting holes for the rotating shafts of the rollers to pass through horizontally are arranged on the mounting bases; a size of the limiting holes limits a movement of the rotating shafts in the height direction; and the limiting holes allow the quick-fitting stool to compress the elastic members when the quick-fitting stool is loaded and make the rollers, the rotating shafts of the rollers, and the support bases move approaching the bottom plate, so that the lower surface of the mounting base reaches and contacts ground.

* * * * *